(12) United States Patent
Magee et al.

(10) Patent No.: US 8,813,228 B2
(45) Date of Patent: Aug. 19, 2014

(54) COLLECTIVE THREAT INTELLIGENCE GATHERING SYSTEM

(75) Inventors: Joseph C. Magee, Prospect Park, PA (US); Alison M. Andrews, New York, NY (US); Mark W. Nicholson, Colts Neck, NJ (US); Jonathon Lance James, Jersey City, NJ (US); Henry C. Li, New York, NY (US); Christopher L. Stevenson, Westfield, NJ (US); Joel Lathrop, Jersey City, NJ (US)

(73) Assignee: Deloitte Development LLC, Hermitage, TN (US)

( * ) Notice: Subject to any disclaimer, the term of this patent is extended or adjusted under 35 U.S.C. 154(b) by 10 days.

(21) Appl. No.: 13/538,831

(22) Filed: Jun. 29, 2012

(65) Prior Publication Data

US 2014/0007238 A1 Jan. 2, 2014

(51) Int. Cl.
*G06F 21/00* (2013.01)
(52) U.S. Cl.
USPC ............................. 726/24; 713/187; 713/188
(58) Field of Classification Search
USPC .................................................. 713/187–188
See application file for complete search history.

(56) References Cited

U.S. PATENT DOCUMENTS

| | | | | |
|---|---|---|---|---|
| 7,496,960 B1* | 2/2009 | Chen et al. | ...................... | 726/22 |
| 2008/0263669 A1* | 10/2008 | Alme | .............................. | 726/24 |
| 2010/0115618 A1* | 5/2010 | Lee et al. | ......................... | 726/23 |
| 2010/0281536 A1* | 11/2010 | Richards et al. | ................. | 726/22 |

OTHER PUBLICATIONS

Maxwell, Kyle R., "Introduction to the Collective Intelligence Framework", Threat Thoughts—Logs or it didn't happen., May 7, 2012, http://threatthoughts.com/2012/05/07/introduction-to-the-collective-intelligence-framework/.
Taylor, Bret, "How FriendFeed uses MySQL to store schema-less data", Bret Taylor Blog, Feb. 27, 2009, http://backchannel.org/blog/friendfeed-schemaless-mysql.
Young, Wes, "the evolution of collective intelligence", GFIRST National Conference 2011, Aug. 11, 2011, 39 slides, http://code.google.com/p/collective-intelligence-framework/downloads/detail?name=ren-isac.pdf.
Young, Wes, "F*#$! your formats, just gimme u're data . . . (reads: 'Collective Intelligence')", ISOI9 Internet Security Operations and Intelligence, May 12, 2011, 7 slides, http://collective-intelligence-framework.googlecode.com/files/ISOI_2011.pdf.
REN-ISAC, "Security Message Standardization—the beginning of the end.", REN-ISAC Member Meeting, Apr. 9, 2011, 51 slides, http://www.ren-isac.net/docs/ren-isac_ses_rimm_2011.pdf.
Educause, "The Evolution of SES, REN-ISAC's Security Event System", Security Professionals Conference 2011, Apr. 6, 2011, http://www.educause.edu/events/security-professionals-conference/2011/evolution-ses-ren-isacs-security-event-system.

(Continued)

*Primary Examiner* — Ghazal Shehni
(74) *Attorney, Agent, or Firm* — Kramer Levin Naftalis & Frankel LLP

(57) ABSTRACT

Threat intelligence is collected from a variety of different sources. The threat intelligence information is aggregated, normalized, filtered and scored to identify threats to an information network. Threats are categorized by type, maliciousness and confidence level. Threats are reported to network administrators in a plurality of threat feeds, including for example malicious domains, malicious IP addresses, malicious e-mail addresses, malicious URLs and malicious software files.

21 Claims, 9 Drawing Sheets

(56) References Cited

OTHER PUBLICATIONS

Iovino, Gabriel, et al., "Security Message Standardization—the beginning of the end", The Evolution of SES, REN_ISAC's Security Event System, Security Professionals Conference 2011, Apr. 6, 2011, 30 slides, http://www.educause.edu/sites/default/files/library/presentations/SEC11/SESS25/spc_2011.pdf.

REN-ISAC, "REN-ISAC", Sep. 7, 2010, 53 slides, http://www.ren-isac.net/docs/ren-isac_ses_20100907.pdf.

Young, Wes, "Collective Intelligence—Security Intelligence is Living, Social Data.", Internet2, Collaborative Data-Driven Security for High Performance Networks 2010, Aug. 18, 2010, 11 slides, http://security.internet2.edu/ddcsw2/docs/wes-young-ddcsw2.pdf.

Young, Wes, "Security Message Standardization—Moving Messages throughout 'the Ether'", Internet2, Collaborative Data-Driven Security for High Performance Networks, 2009, 6 slides, http://security.internet2.edu/ddcsw/docs/young.pdf.

Internet2,"REN-ISAC SES Project", Joint Techs—An International Conference of Networking Engineers, Jul. 21, 2009, video (dvd attached), http://events.internet2.edu/2009/jt-indy/agenda.cfm?go=session&id=10000713&event=1037.

Pearson, Doug, "Security Event System (SES)", Joint Techs, Jul. 2009, 15 slides, http://www.internet2.edu/presentations/jt2009jul/2090721-pearson.pdf.

Internet2, "The Research and Education Networking Information Sharing and Analysis Center (REN-ISAC)", Joint Techs—An International Conference of Networking Engineers, Jul. 21, 2009, 2 pages, http://events.internet2.edu/2009/jt-indy/documents/ren-isac_ses_flier_joint_techs_200907.pdf.

Educase, "REN-ISAC and CSI2—The Security Event System", Security Professionals 2009, Apr. 22, 2009, http://www.educause.edu/events/security-professionals-conference/2009/ren-isac-and-csi2%E2%80%94-security-event-system.

Martin, Tami, et al. "Security Message Standardization—moving security messages through 'the ether'", Educase Security Professionals 2009, Apr. 22, 2009, 15 slides, http://www.educause.edu/events/security-professionals-conference/2009/ren-isac-and-csi2%E2%80%94-security-event-system.

Mitchell, Chris, et al. "Capstone Project GWU MSIST Cohort XI", Net Security Services | avenger, Dec. 10, 2011, 341 pages.

Bilge, Leyla, et al. "EXPOSURE: Finding Malicious Domains Using Passive DNS Analysis", In Proc. 18th Annual Network and Distributed System Security Symposium (NDSS), San Diego, CA, Feb. 2011, 17 pages.

Collective-intelligence-framework, "CliClientExamples_v0—Example Client Commands and outputs (v0)", http://code.google.com/p/collective-intelligence-framework/wiki/CliClientExamples_v0; Aug. 22, 2012.

Collective-intelligence-framework, "Frequently Asked Questions", http://code.google.com/p/collective-intelligence-framework/wiki/FAQ; Aug. 25, 2012.

* cited by examiner

EXAMPLE: pornoeblyadlyatebya.ru

| domain | PORNOEBLYADLYATEBYA.RU |
|---|---|
| Nserver1 | ns1.reg.ru |
| Nserver2 | ns2.reg.ru |
| state | REGISTERED, DELEGATED, UNVERIFIED |
| person | Private Person |
| e-mail | abatinsan@gmail.com |
| registrar | REGRU-REG-RIPN |
| created | 2012.07.19 <--[Create Date will be noted] |
| paid-till | 2013.07.19 |

A breakdown of the name server including networks:

EXAMPLE: megaarchivschoolpornu.ru

| | |
|---|---|
| domain | MEGAARCHIVSCHOOLPORNU.RU |
| Nserver1 | ns1.reg.ru |
| Nserver2 | ns2.reg.ru |
| state | REGISTERED, DELEGATED, UNVERIFIED |
| person | Private Person |
| e-mail | abatinsan@gmail.com |
| registrar | REGRU-REG-RIPN |
| created | 2012.07.18 |
| paid-till | 2013.07.18 |

FIG. 7

EXAMPLE: megaarchivtrax.ru

| domain | MEGAARCHIVETRAX.RU |
|---|---|
| Nserver1 | ns1.reg.ru |
| Nserver2 | ns2.reg.ru |
| state | REGISTERED, DELEGATED, UNVERIFIED |
| person | Private Person |
| e-mail | abatinsan@gmail.com |
| registrar | REGRU-REG-RIPN |
| created | 2012.07.18 |
| paid-till | 2013.07.18 |

FIG. 8

EXAMPLE:
DOMAIN: uvelichcheln.ru
QUERY: http://www.google.com/safebrowsing/diagnostic?site=uvelichcheln.ru
RESULT:

FIG. 9

COLLECTIVE THREAT INTELLIGENCE GATHERING SYSTEM

FIELD

The embodiments described herein generally relate to a system of gathering intelligence about threats to an information network, from a wide variety of difference sources of threat information, and presenting that information to administrators of the information network in a coherent and useable format.

BACKGROUND INFORMATION

Information networks are threatened on a daily basis with attacks from malicious computers or software, such as botnets (collections of computers controlled by a central actor, used for malicious purposes), computer viruses, worms, trojan horses, spyware, adware, phishing URLs or emails (URLs or emails designed to fool users into revealing private information), and rootkits. This software is often referred to collectively as "malware." To combat the threats posed to information networks by malware, the administrators of these networks need information about potential and actual threats, including information identifying sources of malware, such as suspicious websites, domains, IP addresses, URLs, e-mail addresses, and files.

There are a number of providers of threat information, both open source and paid/closed source. These providers supply intelligence feeds, which provide information about threats the provider has identified. Most network administrators subscribe to both open source and paid/closed source threat and intelligence feeds to keep up with current malware activity. However, each of these feeds comes in a proprietary format, and depending upon the strength of the research and development unit behind them, also comes with widely variant degrees of validation and reliability. As a result, it is difficult for network administrators to aggregate these disparate intelligence feeds into a format that is useable with their organizations. This results in the intelligence feed data going un- or under-utilized. Thus there is a need for a single normalized, validated threat feed that aggregates threat information from many sources, and that can be immediately put to use defending information networks, in real-time, against current malware threats.

SUMMARY

The embodiments provided herein are directed to a system for processing a plurality of threat intelligence feeds from a variety of sources. The plurality of threat intelligence feeds are first aggregated together into a combined threat intelligence feed. The threat intelligence feeds are then normalized by extracting information from each feed, storing it in a database and enriching the information with additional information relating to the extracted information. The threat intelligence information is then filtered to improve the quality of the information. The information is then validated, to further improve the quality of the information and to assign each item of information a threat score. The information is then reformatted to integrate with additional tools used by the network administrators to monitor threats to their information networks such as security information and event management (SIEM) tools like ArcSight, enVision or Q1 Radar.

Other systems, methods, features and advantages of the invention will be or will become apparent to one with skill in the art upon examination of the following figures and detailed description.

DESCRIPTION OF THE DRAWINGS

The details of the invention, including structure and operation of the system, may be gleaned in part by study of the accompanying figures, in which like reference numerals refer to like components.

FIGS. 7 and 8 show additional example domain name record data, used in an embodiment of the invention.

FIG. 9 shows the results of a diagnostic query about a potentially malicious domain, used in an embodiment of the invention.

DESCRIPTION OF EMBODIMENTS

Figure 1:
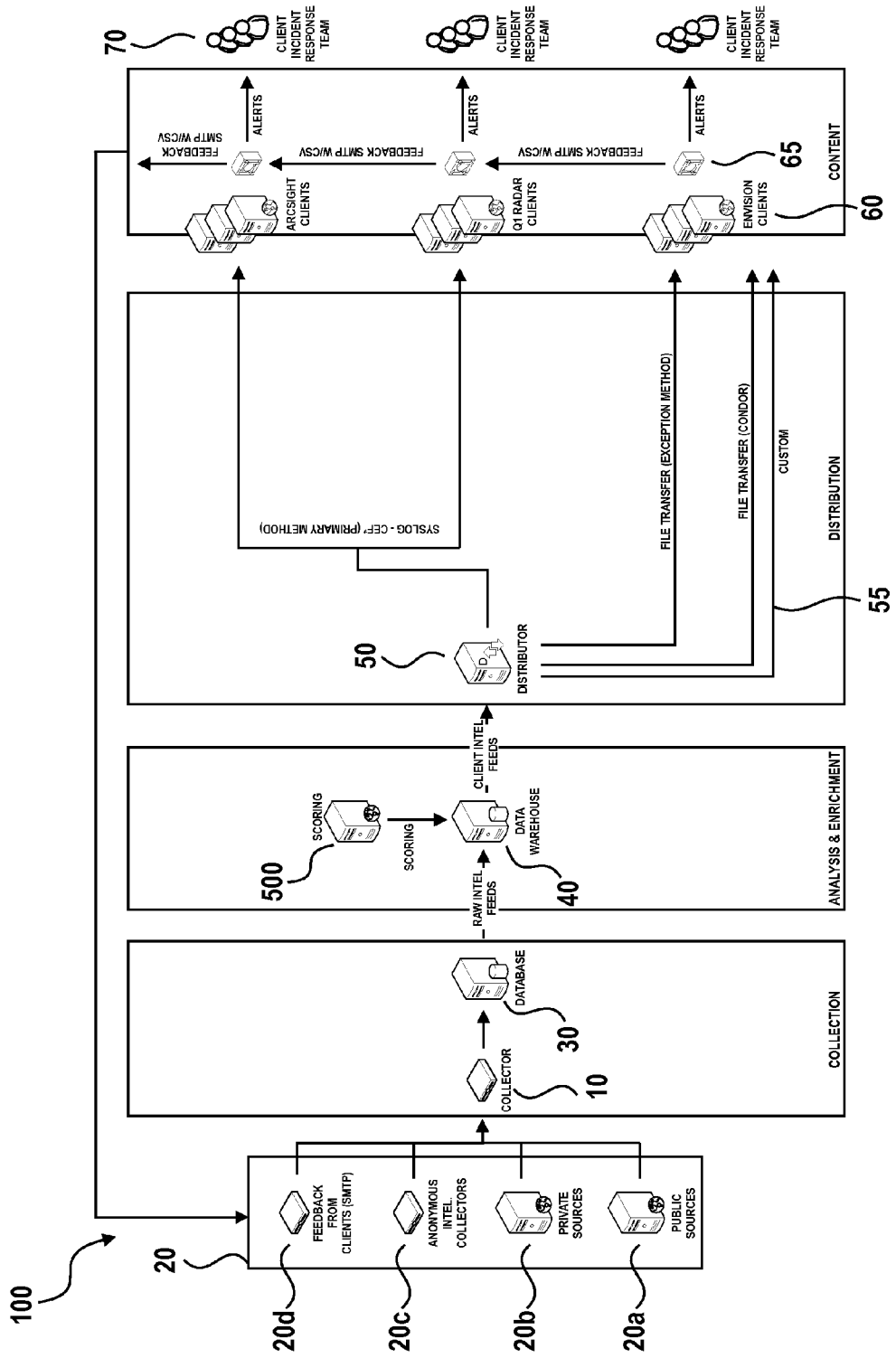
FIG. 1 shows a high-level overview of a system for processing collective threat intelligence information, according to an embodiment of the invention.

With reference to FIG. 1, in an embodiment a system 100 for collective threat intelligence gathering and processing includes a data collector 10, which interfaces with a plurality of intelligence information sources 20. The intelligence information sources 20 include public sources 20a such as those listed in Table 1 below:

TABLE 1

Example Public sources http://www.malwaredomains.com/files/domains.txt
http://www.malwaredomainlist.com/hostslist/mdl.xml
http://malc0de.com/rss/
http://www.sshbl.org/lists/date.txt
https://spyeyetracker.abuse.ch/monitor.php?rssfeed=tracker.
http://www.spamhaus.org/drop/drop.lasso
http://www.malware.com.br/cgi/submit?action=list_hashes
http://www.threatexpert.com/latest_threat_reports.aspx
http://s3.amazonaws.com/alexa-static/top-1m.csv.zip
http://data.phishtank.com/data/$apikey/online-valid.json
http://aper.svn.sourceforge.net/svnroot/aper/phishing_reply_addresses
https://zeustracker.abuse.ch/monitor.php?urlfeed=binaries
https://zeustracker.abuse.ch/monitor.php?urlfeed=configs
https://zeustracker.abuse.ch/rss.php
http://www.malware.com.br/cgi/submit?action=list_hashes
http://www.malware.com.br/cgi/submit?action=list_xml
http://amada.abuse.ch/blocklist.php?download=ipblocklist
http://amada.abuse.ch/blocklist.php?download=proactivelistings The intelligence information sources 20 further include private sources 20b such as human intelligence resources, including information gained via participation in covert and membership communities. Such participation would include gaining membership in communities that engage in malicious activity, such as social networks, chat rooms (e.g. IRC), or other similar communities, for the purpose of monitoring those activites to acquire intelligence information. The private sources 20c would also include paid sources of intelligence information.

The intelligence information sources 20 further include anonymous intelligence collectors 20c. Anonymous intelligence collectors 20c are network devices (e.g. a router, bridge or other computer configured with software to collect intelligence data, such as IP addresses, domain names, URLs, e-mail addresses or files) which are placed anonymously at sites on the Internet. For example, an anonymous intelligence collector 20c could be placed at a key location such as an Internet backbone link, an Internet Service Provider (ISP), a large educational institution such as a university, or other locations which experience a high volume of network traffic. These anonymous intelligence collectors 20c collect data about the network traffic which passes through the location, and report that data back to the data collector 10, anonymously. These anonymous intelligence collectors 20c may also actively visit suspicious domains, websites or URLs and collect information useful for threat intelligence.

For example, the collectors 20c may visit a suspicious domain and determine whether it is still active, or whether it contains files known or believed to be malicious. If exploits or other attacks are being launched from the domain or website, the collectors 20c will gather information about the attacks and identify if the site is still hostile, and what type of hostility occurs (e.g. a categorization of exploit types). This information can be used to categorize the domain as discussed in further detail below, based on the threat type, and extract further information from the site based on knowledge gained about the workings of the malicious site. The collectors 20c may gather, for example, information about the size of a botnet and the computers infected, infected IP addresses, siphoned data, configurations, and possibly credentials that control the malware or exploit control panel. The anonymous intelligence collectors 20c may also be configured to appear as locations desirable for malware creators to attack or penetrate. Such locations are sometimes referred to as "honeypots". Honeypots are designed to invite malicious activity, so that the malicious activity can be tracked, identified, researched or otherwise analyzed.

It is advantageous, though not required, for the anonymous intelligence collectors 20c to be located at network locations which have no publicly-known connection or link to a provider of the data collector 10. If the intelligence collectors 20c are anonymous, then it is more difficult for suppliers of malware to avoid, attack or otherwise react to the presence of these collectors 20c.

The intelligence information sources further include consumer feedback 20d from the consumers 60 (e.g. network administrators 70 and the entities for whom they work) who ultimately receive the collective threat intelligence information feeds discussed herein.

The raw intelligence information may be periodically collected from the information sources 20, for example on an hourly basis. Alternatively the raw intelligence information may be broadcast to the data collector 10 by the information sources 20 in real-time, or periodically. The raw intelligence information collected by the data collector 10 from the intelligence information sources 20 is aggregated and stored in an intelligence feed database 30.

Figure 2:
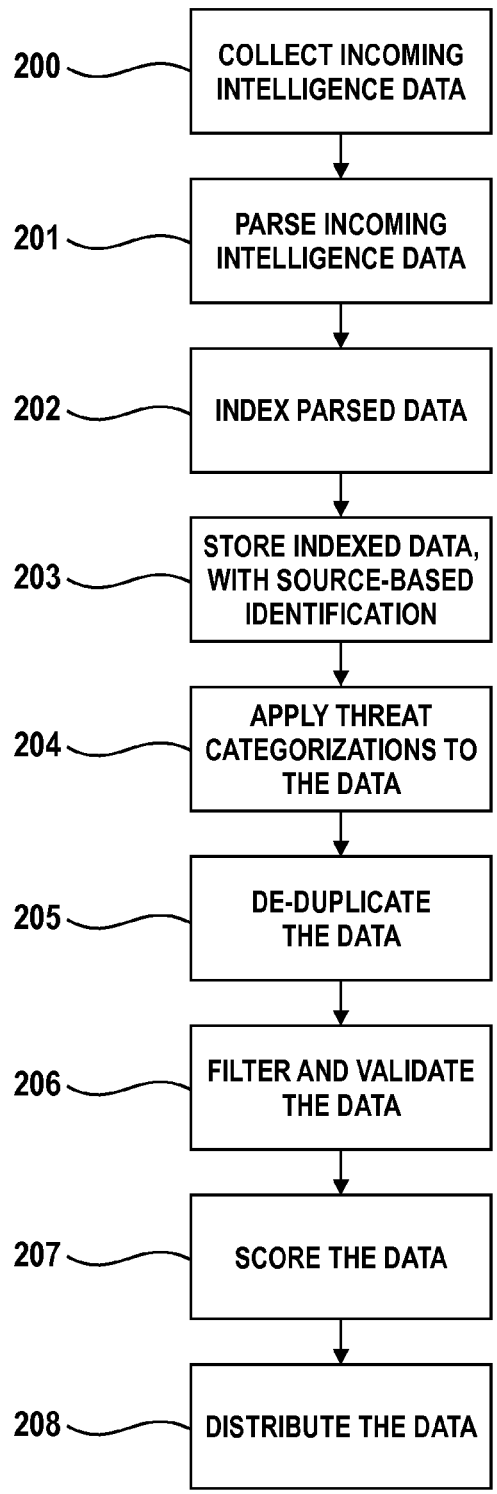
FIG. 2 shows a method for processing intelligence information, according to an embodiment of the invention

Aggregation and normalization of the raw intelligence information is done, in an embodiment, according to the method shown in FIG. 2. At step 200, the raw intelligence information is collected by the data collector 10 from the intelligence information sources 20. At step 201, the raw intelligence information stored in the database 30 is parsed, to identify the format that the data is in, and convert it to a format useable by the system of an embodiment. For example, incoming intelligence information may be in plain text format, or it may be in other formats useful for exchanging information across a computer network, such as XML, JSON (JavaScript Object Notation), CSV (comma separated values), or HTML. For delimited formats such as CSV, regular expression parsing may be used. For other files, they are parsed according to the format of raw intelligence information arriving at the collector 10. Once the raw intelligence information has been parsed, then the individual data items pulled from the raw intelligence feed are indexed at step 202. At step 203, the indexed data is stored in the database 30, along with information that identifies the source 20 of the data.

At step 202, different types of incoming data are indexed. URL information is analyzed to derive a domain name and an IP address for the URL. For example, the URL:

http://www.mynetwork.com/files/downloads/malicious would be converted to the domain name:

mynetwork.com and the IP address would be looked up using a lookup service such as the Domain Name Service (DNS) of the Internet. That IP address, for example, could be expressed as 1.1.1.1, using the Internet Protocol address format commonly used on the Internet. At step 203, the URL, domain name and IP address are each stored in the database 30, along with information identifying the source 20 (e.g. open source, private source, anonymous collector, etc.) that provided the URL to the collector 10. At this point, additional desired information obtained from the DNS server could also be linked with the URL information and stored in the database 30.

E-mail address information is similarly analyzed, to derive a domain name and an IP address for the e-mail. For example, the e-mail address:

joe@mynetwork.com would be converted to the domain name:

mynetwork.com and the IP address would be looked up as above. At step 203, the e-mail address, domain name and IP address are each stored in the database 30, along with information identifying the source 20 (e.g. open source, private source, anonymous collector, etc.) that provided the e-mail address to the collector 10. At this point, additional desired information obtained from the DNS server could also be linked with the e-mail address information and stored in the database 30.

IP address information is enhanced by looking up the corresponding domain name using a lookup service such as the Domain Name Service of the Internet, with a reverse lookup mode of operation. Similarly, domain name information is enhanced by looking up the corresponding IP address using a lookup service such as the Domain Name Service of the Internet, with a forward lookup mode of operation. At step 203, the IP address and the domain name are stored in the database 30, along with information identifying the source 20 (e.g. open source, private source, anonymous collector, etc.) that provided the IP address to the collector 10. At this point, additional desired information obtained from the DNS server could also be linked with the domain or IP address information and stored in the database 30.

Autonomous System information, such as an Autonomous System Number (ASN) is pulled from the incoming data and stored in the database 30. An Autonomous System is a collection of Internet Protocol (IP) addresses, or prefixes which define a range of such addresses, that together are grouped into a recognized combination, such that traffic may be routed for all such addresses or prefixes, according to a single routing policy. For example, an Internet Service Provider could control multiple IP prefixes (e.g. 10.x.x.x, 30.x.x.x, 100.x.x.x) for which all traffic should be routed to the ISP. The ISP would be identified by a unique ASN. This ASN is indexed at step 202 and stored at step 203.

Additional information is also indexed and stored according to the method of FIG. 2. For example, a Time to Live (TTL) value, indicative of the age of the information, can be indexed and stored. These TTL values are commonly associated with Domain Name Service records that identify IP addresses and domain names.

When the indexed data is stored in the database 30, it is placed into a table within the database 30 that correlates to the type of the data. For example, the database 30 of an embodiment may contain tables for storing the data types listed in Table 2 below.

TABLE 2

Data types tracked

| Table Name | Description |
| --- | --- |
| Binaries | Potentially malicious files such as virus-infected files, trojan horses, etc. |
| Configs | Configuration files and locations of configuration files for malicious software such as Trojan horses (e.g. for banking-related attacks) etc. |
| Domains | Potentially malicious Internet domain names. |
| Domains_blocklist | Internet domain names on a list of domains to be blocked, according to the source (likely malicious). |
| IP_blocklist | Internet Protocol addresses on a list of addresses to be blocked, according to the source (likely malicious). |
| malware | Possible sources for malware to be downloaded from. |
| infrastructure | IP's and autonomous network ranges (ASNs) on the Internet that may host malicious activity. |
| URL_malware | URLs where malware may be located. |
| URL_phishing | URLs where phishing attempts may be directed to. |
| Domain_whitelist | Domains that have been confirmed as non-malicious, by the source. |
| email | E-mail addresses phishing attempts may be directed to. |

Figure 3:
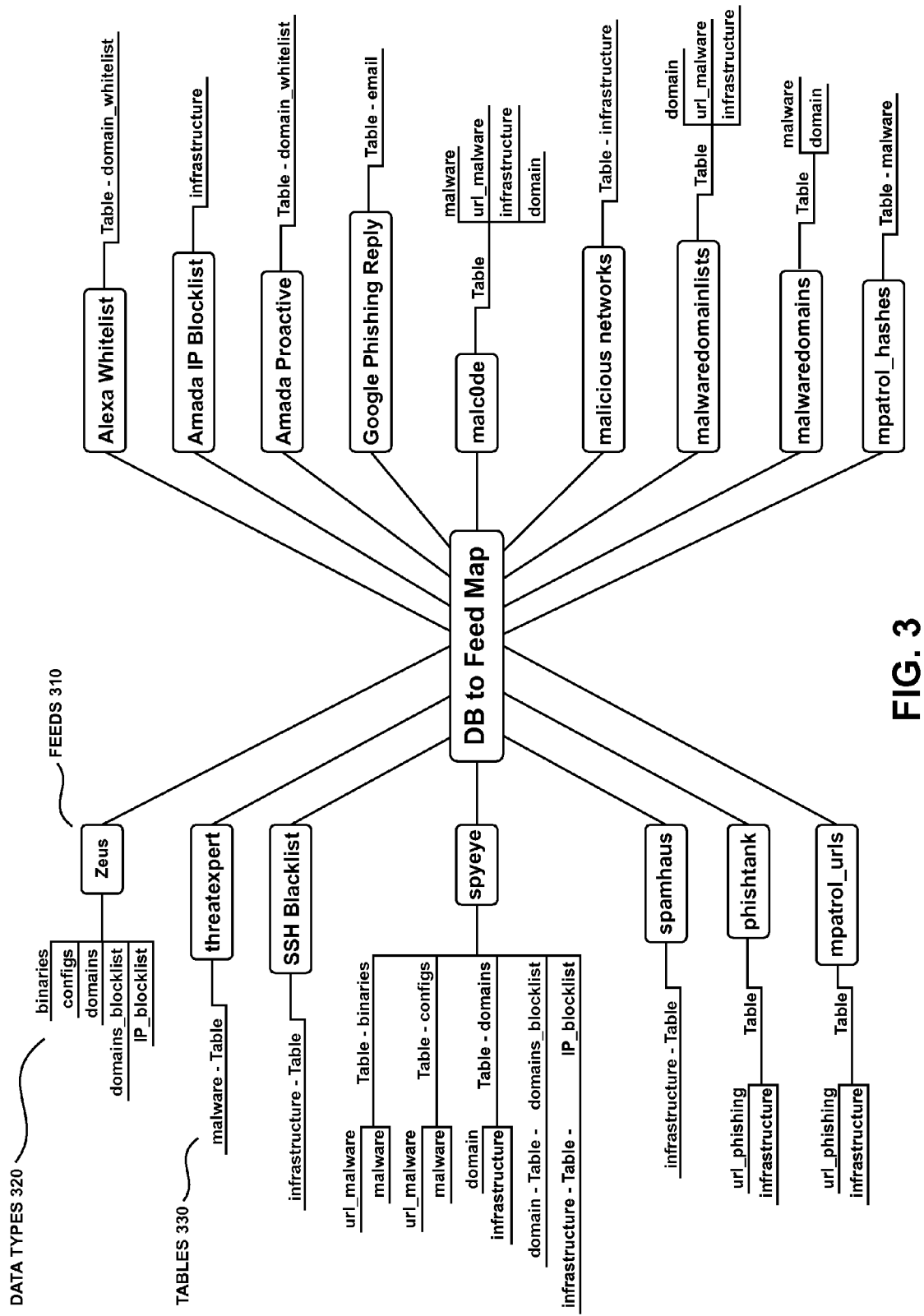
FIG. 3 shows a mapping of intelligence information sources to database tables, according to an embodiment of the invention.

The type of the data from each incoming raw intelligence source 20 is classified according to a mapping, such as the mapping shown in FIG. 3. Each raw intelligence source 20 is represented as a feed 310. Some feeds 310 may deliver multiple different types of data, such as the "spyeye" feed. Other feeds 310 may deliver only a single type of data, such as the "threatexpert" feed. The data is categorized by type according to the types listed in Table 2 above. Once categorized, the data for each type is stored into a table configured to contain data of that type. For example, data reflecting phishing e-mail reply addresses (i.e. the e-mail address that a phishing e-mail or URL asks the recipient to respond to) is placed in the email table. The name of a domain identified as possibly hosting malware is placed into two tables, one listing malicious domains and a second that tracks the infrastructure used to support malicious activity, which could include other domains, or higher-level collections of multiple domains (e.g. all domains tied to a given ASN).

The incoming intelligence data is preferably grouped into a plurality of feeds reflecting the general type of data contained in the feed. For example, the incoming intelligence data may be grouped into the feeds listed in Table 3 below

TABLE 3

Intelligence data feeds

| Feed | Content |
| --- | --- |
| domain | Domain names collected by the data collector 10. |
| URL | URLs collected by the data collector 10. |
| IP | IP addresses collected by the data collector 10. |
| hash | Hash data about files collected by the data collector 10. |
| Phishing email | e-mail addresses (either sender or reply addresses) collected by the data collector 10. |

Figure 4:
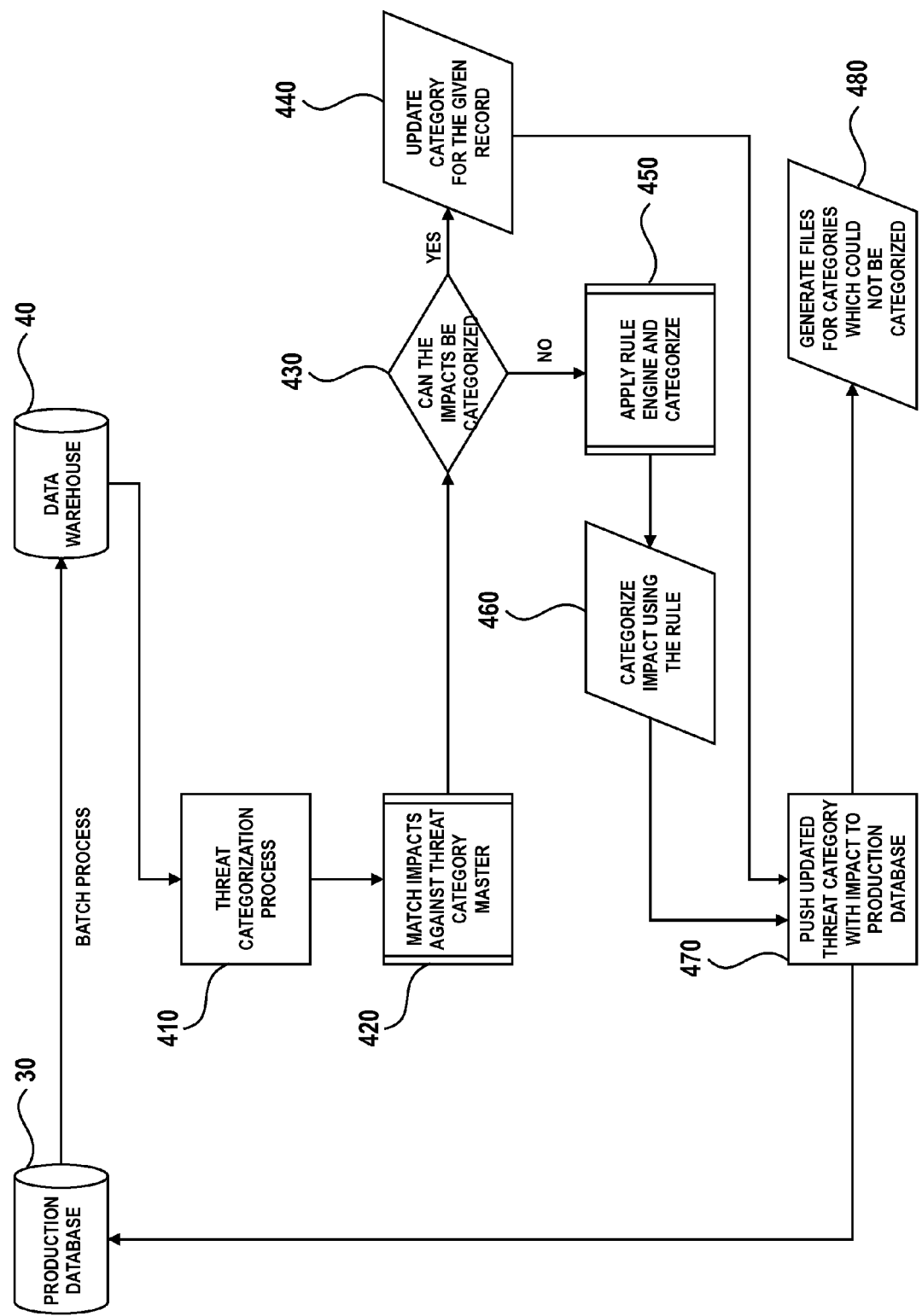
FIG. 4 shows a method of categorizing the threat represented by the intelligence information collected according to an embodiment of the invention.

In addition to categorizing the incoming intelligence data by the type of the data, this data is also further categorized according to the type of the threat represented by the data, at step 204 of FIG. 2. The threat categorization process of an embodiment of the invention is shown in FIG. 4. In an embodiment, the intelligence data stored in the database 30 is transferred to a data warehouse 40 (i.e. a second database adapted to facilitate storage of, analysis of and reporting on large volumes of data). Alternatively, the intelligence data is retained in the database 30 (which may be a production database) for further analysis.

At step 410, the uncategorized records representing the aggregated incoming intelligence data are retrieved from the data warehouse 40 (or alternatively from the database 30). Each incoming record contains a threat impact. A threat impact is a field in the database that describes the impact of a threat, such as "exploit", "drop zone", "Command and Control". This assists in assessing the type of action/response that should be taken when the threat is introduced within the environment by the alert ultimately provided to the consumer 60 by the distributor 50, as discussed below.

At step 420, the threat impact of each record is matched against a threat category master, which is a template that models a given threat to network security.

At step 430, the threat categorization method determines whether the threat impact can be categorized, for example because the threat impact for the record matches a particular threat impact master. If the threat impact can be categorized, then at step 440 the record is assigned to the proper threat category. If, however, the threat impact does not match any of the existing category mappings within the system of an embodiment, and thus cannot be categorized according to the threat category master, then at step 450 the threat impact is provided to a rule engine. The rule engine applies one or more rules that have been derived to predict which category a given threat impact likely belongs to. At step 460, the rule engine categorizes the threat impact into a category, using the applicable rules.

For example, one of the rules of an embodiment is configured to identify a particular malware threat, a Trojan known as "zeus". This rule looks for the case insensitive string "zeus" (and potential misspellings) in the source record's threat impact field. If this string is found, then that particular entry will be categorized as category=malware, type=trojan, subtype=zeus, and version=<null>. The source impact field along with the category mapping is then added back into the list of static CTI Category mappings maintained by the threat impact master. Exceptions which cannot categorized via the CTI Category mappings in the threat category master, or by the rules engine, are manually reviewed and categorized at step 480 as discussed below. The CTI Category mappings and set of rules in an embodiment are generated by analyzing a large number of intelligence information records, to identify categories and rules for the rules engine. Both the static CTI Category mappings and the rules are tuned manually as necessary to ensure accurate categorization.

At step 470, the now-categorized record is returned back to the database 30, or optionally the data warehouse 40, for further processing and analysis. At step 480, a report is generated which identifies those records that could not be categorized by application of either the threat category master or the rule engine. This report may be provided to an administrator or analyst for further evaluation, and the un-categorized records may be manually categorized by the administrator or analyst.

Table 4 below lists examples of the threat categories that may be applied to the incoming intelligence data records.

TABLE 4

Threat Categories

| Cat ID | Category Name | Category Description |
| --- | --- | --- |
| 1 | CnC | Malware Command and Control Server |
| 2 | Bot | Known Infected Bot |
| 3 | Utility | Known Good Public Utility |
| 4 | Spam | Known Spam Source |
| 5 | Drop | Dropper Exe Retrieval and delivery host |
| 6 | SpywareCnC | Spyware Reporting Server |
| 7 | OnlineGaming | Questionable Gaming Site |
| 9 | DriveBySrc | Driveby Source |
| 10 | ChatServer | POLICY Chat Server |
| 11 | TorNode | POLICY Tor Node |
| 12 | Compromised | Known compromised or Hostile |
| 13 | P2P | P2P Node |
| 14 | Proxy | Proxy Host |
| 15 | IPCheckIP | Check Services |
| 16 | SocialMedia | Social Media sites and servers |
| 17 | DDoSTarget | Target of a DDoS |
| 18 | ScannerHost | Performing Scanning |
| 19 | Brute Forcer | SSH |
| 20 | FakeAV | Fake AV and AS Products |
| 21 | DynDNS | Domain or IP Related to a Dynamic DNS Entry or Request |
| 22 | Undesirable | Undesirable but not illegal |
| 23 | AbusedTLD | Abused or free TLD Related |
| 24 | SelfSignedSSL | Self Signed SSL or other suspicious encryption |
| 25 | blackhole | Darknets |
| 26 | RemoteAccessService | GoToMyPC and similar remote access services |
| 27 | P2PCnC Distributed | CnC Nodes |
| 28 | malware | General Malware |
| 29 | Dynamic dns | Dynamic Domain Name Service, |
| 30 | Name server | The name server responsible for the domain name. |
| 31 | botnet | General Botnet (distributed malware network). |
| 32 | Suspicious infrastructure | IP's or autonomous network ranges that host malicious or suspicious activity. |

Ultimately, each feed of incoming intelligence data enumerated in Table 3 is categorized using the threat categories in Table 4. Additional categorization information may also be added, to further refine the analysis for each record in the incoming intelligence data feeds. For example, a given category such as "malware" may be broken down into a "type" of malware, each "type may be broken down further by "sub_type" and each sub_type may be further assigned a version number. By this nomenclature, a flexible, but detailed, classification of threats, across multiple intelligence data sources 20, is possible. Table 5 below presents an example listing of categories according to an embodiment of the invention:

TABLE 5

Example Category Listing for Sample Intelligence Data Feed

| category | type | sub_type | version |
| --- | --- | --- | --- |
| malware | trojan | cidox/mayachok | |
| malware | trojan | yoddos | |
| malware | trojan | zeus | |
| malware | trojan | golns | |
| botnet | ddos | | |
| malware | hack tool | | |
| malware | trojan | yakes | |
| malware | exploit kit | blackhole | |
| malware | exploit kit | fragus | |
| malware | exploit kit | phoenix | |
| malware | exploit | | |
| malware | trojanproxy | win32/brownet.a | |
| malware | trojan | injector | |
| malware | trojan | zeus | v2 |
| malware | trojan | exploit kit | |
| malware | exploit kit | crimepack | v3.1.3 |
| dynamic dns name server | | | |
| malware | trojan | menti | |
| malware | exploit kit | | |
| malware | trojan | injector | |
| malware | trojan | exploit kit | |
| malware | rootkit | iframe | |
| name server | | | |
| botnet | ssh | | |
| malware | exploit kit | | |
| suspicious infrastructure | | | |
| malware | ssh | | |

Once the incoming threat intelligence data is categorized, at step 205 of FIG. 2 it is then de-duplicated. De-duplication is useful to reduce the volume of data being reported to the network administrators or other consumers of the threat intelligence data. It also assists in managing data in an analyst environment effectively, reduces potential capacity issues, reduces network bandwidth, and reduces administration time and cost. In an embodiment, a threat information record is considered unique if both the relevant address or other identifier for the record (i.e. domain name, IP address, ASN address, e-mail address, file hash, URL) and the categorization for that record is unique in the database 30 (or data warehouse 40). Alternatively, multiple instances of the same categorization (i.e. threat) from the same source, may be tracked as separate instances, and reported downstream to the consumers 60. This is useful, for example, to report to the downstream consumer 60 that a given malware source generated multiple instances of the same threat, over a given timeframe. This would indicate a more dangerous threat that one that only generated one instance of the same threat in that time period.

Once the threat intelligence information is categorized and de-duplicated, then at step 206 of FIG. 2, this information is filtered. Filtering is helpful because it can further reduce the volume of threat information reported to the downstream administrators or consumers of the threat intelligence information. Filtering eliminates false positives, and known non-threatening information. Filtering also removes data that is known to be inaccurate.

One type of filtering that can be applied according to an embodiment of the invention is whitelist filtering. A whitelist filter receives an address, such as an IP address, a domain name, an e-mail address, an ASN, or other such identifier of a potential threat. The filter does a lookup of that received address against a maintained list of known non-malicious addresses. If the received address is found in the list of non-malicious addresses, then the intelligence information record containing that address is filtered out of the intelligence feed, and is not reported to the downstream administrator or customer.

Similarly, a blacklist filter may be applied to the intelligence information records, in an embodiment of the invention. A blacklist filter queries a variety of maintained lists of known malicious addresses. If the address in the intelligence record does not appear in the blacklist, it may be either filtered or designated for a lower priority or lower threat level. If the address does appear in the blacklist filter, the record may be designated for a higher priority or higher threat level. If the maintained blacklist contains any additional information about the address, such as an explanation as to why the address was placed on the black list, that information may be added to the intelligence information record for the address.

Similarly, a malformed address filter can be applied according to an embodiment of the invention. The malformed address filter will examine the address listed in the intelligence information record, and parse it to confirm that the address conforms to the standard format for that address. For example, the malformed address filter can examine the address types listed in Table 6, against the standard formats listed therein, to confirm that the address information is properly formed.

TABLE 6

Address Format Standards

| Address Type | Standard Format |
| --- | --- |
| Domain: | subset of RFC 1035 (http://datatracker.ietf.org/doc/rfc1035/) |
| URL: | subset of RFC 1738 (http://datatracker.ietf.org/doc/rfc1738/) |
| IP: | dotted decimal notation from RFC 791 (http://datatracker.ietf.org/doc/rfc791/) |
| email: | subset of RFC 5322 (http://datatracker.ietf.org/doc/rfc5322/) |

Additionally, other unwanted patterns found in the incoming intelligence information may be filtered out. For example, any unwanted IP addresses or domain names may be filtered out at this step, so they are not reported to the downstream administrators or consumers. For example, the domain "in-addr.arpa" is considered a valid domain, but this domain has no practical use in today's Internet, and does not assist in identifying or evaluating threats. Thus this domain is detected and filtered out of the incoming intelligence information.

Figure 5:
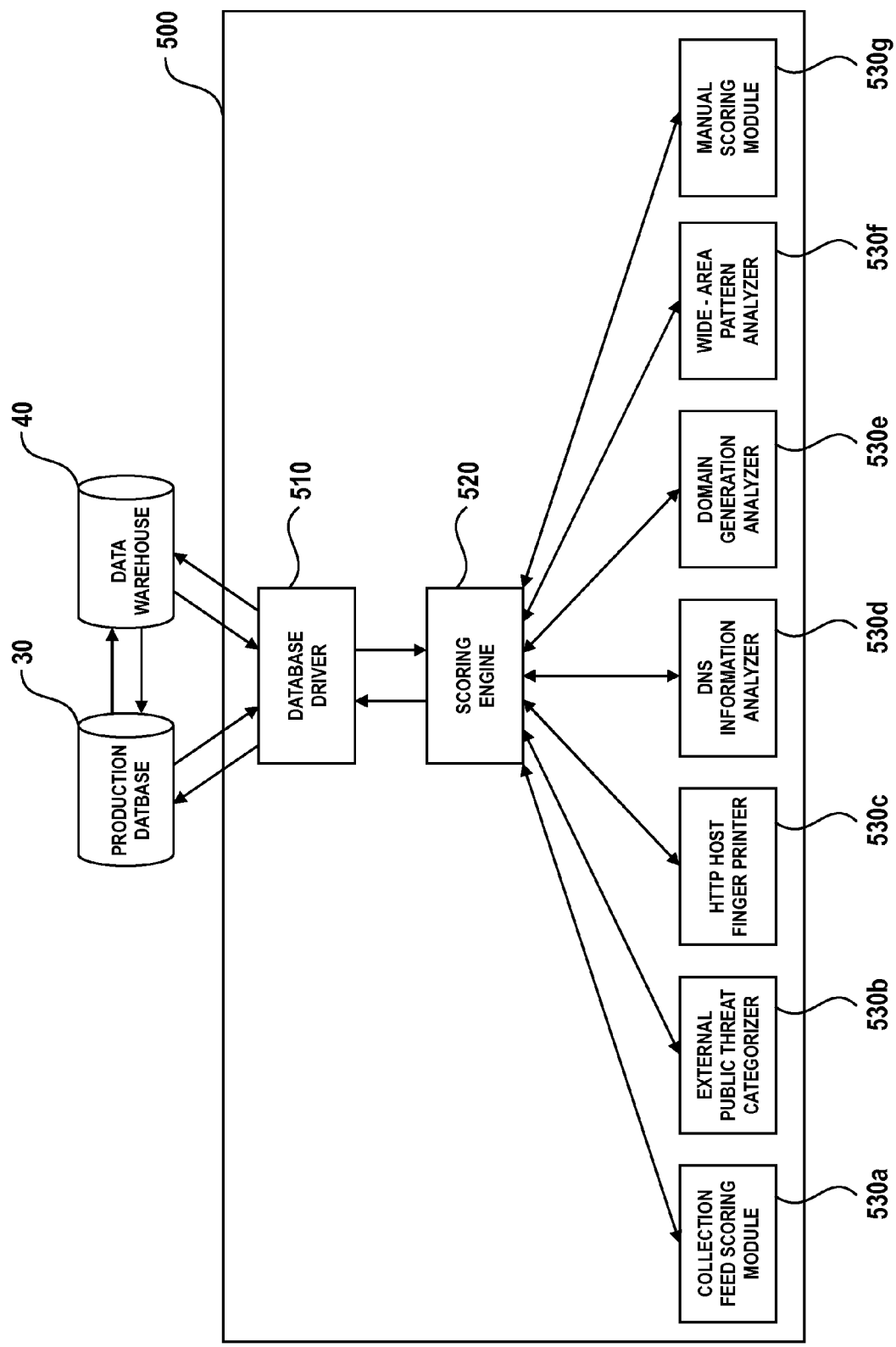
FIG. 5 shows the architecture of a scoring system according to an embodiment of the invention.

At step 207 of FIG. 2, once the incoming intelligence information records have been filtered and validated, they are analyzed to identify and quantify the threat posed by the records. In an embodiment of the invention, the analysis at step 207 is done using a scoring system 500 as shown in FIG. 5. The scoring system 500 queries the database 30, the data warehouse 40, or some other database containing the incoming intelligence information records. The scoring system 500 then analyzes these records and computes a threat score for each record. In an embodiment, the threat score includes a maliciousness ranking and a confidence (i.e. uncertainty) score for the threat. The threat score and the confidence score are then written back to the database 30 or data warehouse 40.

The scoring system 500 includes a database driver 510, which reads outputs from the database 30 or data warehouse 40 to obtain the incoming intelligence information records for scoring. The database driver 510 delivers the information records to the scoring engine 520. The scoring engine 520 delivers a copy of each intelligence record to the various scoring modules 530. Each scoring module 530 receives the intelligence record, analyses the intelligence record according to the methodology or algorithm specified for that scoring module, and reports back a threat score. The scoring engine 520 aggregates the threat scores reported by each of the scoring modules 530, and reports an aggregate threat score back to the database driver 510 for each intelligence information record.

The aggregate threat score may be derived using a variety of aggregation algorithms. One example algorithm used in an embodiment is to take the weighted arithmetic mean of the threat scores reported back from the scoring modules 530. Each scoring module is assigned a weight, based on an assessment of the reliability of that scoring module's methodology or algorithm at identifying or quantifying threats to information networks. The database driver 510 then writes this aggregate threat score back to the database 30, or to the data warehouse 40.

The scoring is performed using a set of scoring modules 530, each of which applies a particular methodology or algorithm to a given intelligence information record. Each module analyzes the threat and produces a value reflecting the analysis. Then the scoring engine 520 derives its maliciousness score and confidence from these values.

In an embodiment shown in FIG. 5, the set of scoring modules 530 includes a collection feed score module 530a, an external public threat categorization module 530b, an HTTP fingerprinter module 530c, a DNS information analyzer module 530d, a domain generation analyzer module 530e, a pattern analyzer module 530f and a manual scoring module 530g. Other modules applying other methodologies or algorithms may also be added to the scoring system.

Some of the information sources 20 which supply intelligence information to the collector 10 also assign their own ratings or scores to the information they supply, using any arbitrary rating or scoring system. The collection feed score module 530a evaluates this supplied threat information, and converts it to a standardized maliciousness ranking, which can be correlated and compared with the maliciousness rankings generated by the other scoring modules 530. The collection feed scoring module 530a also generates an associated confidence level, based on available or derived metrics reflecting the reliability of the particular information source 20. For example, the collection feed score module 530a may be trained by a human analyst to recognize certain information sources 20 as being more reliable than others, or it may train itself by comparing its own output to known high-quality sources for identifying malicious domains, IP addresses, URLs, e-mail addresses or other such addresses. If the module's output strongly correlates with the known high-quality source, then the module can increase either the maliciousness ranking, the confidence level, or both. If the module's output does not strongly correlate to the known high-quality source, then the module can decrease either the maliciousness ranking, the confidence level, or both.

The external public threat categorization module 530b receives the intelligence information record and queries one or more external threat categorization services with the threat data contained in the intelligence information record. The external threat categorization service will then return its classification of that data, in its own arbitrary rating or scoring system. The returned rating is then converted to the standardized maliciousness ranking and confidence level, in a manner similar to that described above for the collection feed scoring module 530a.

Figure 9:
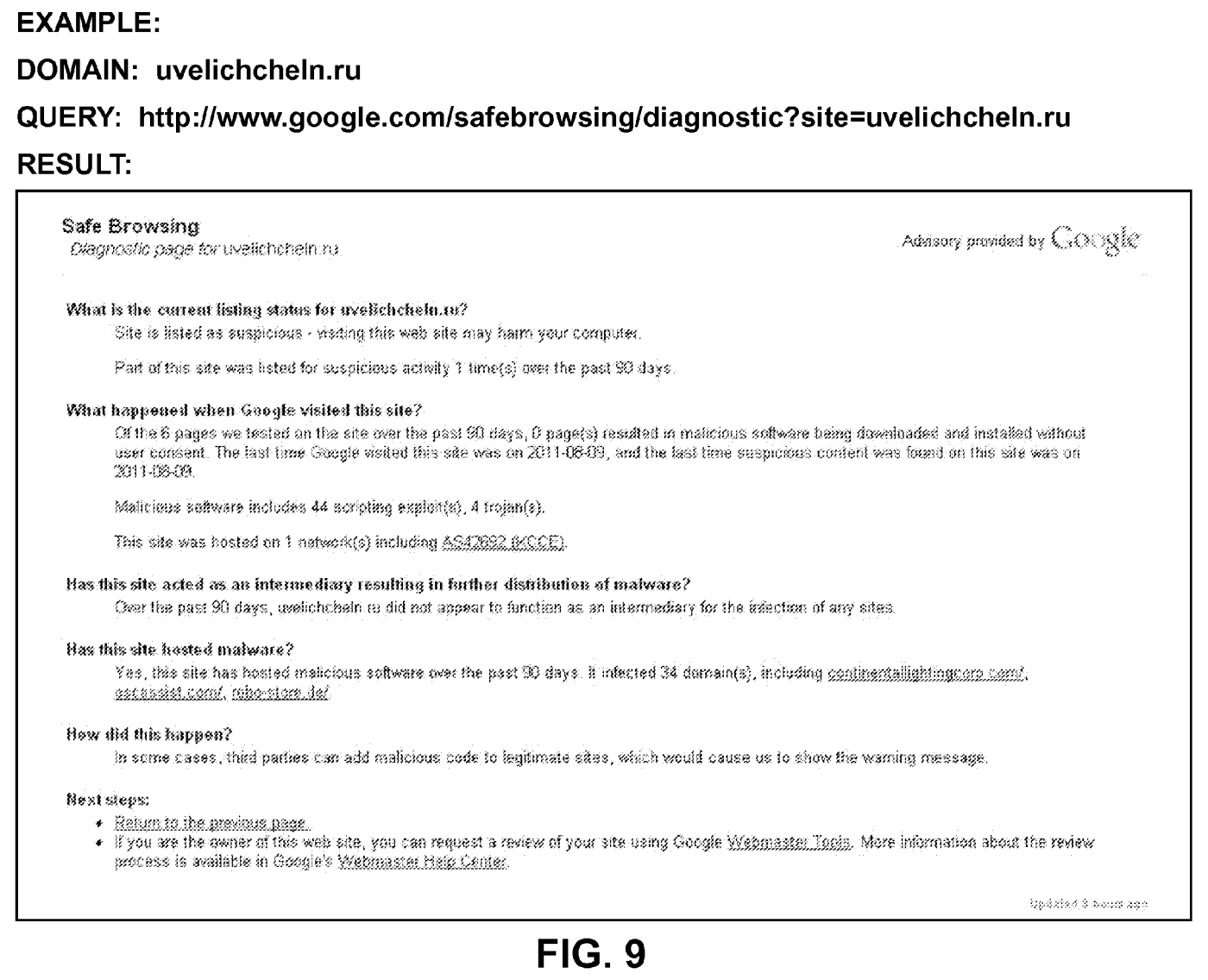

One example of an external public threat categorization module 530b is a module that extracts data from the "safe browsing" project sponsored by Google Inc. of Mountain View, California. Google's Safe Browsing project provides a diagnostics page which reports information about domains, in response to queries. For example, a query on the domain "uvelichcheIn.ru" may return the diagnostic information reflected in FIG. 9. The key components of this data returned by the query is extracted, into the data structure of Table 7 below.

TABLE 7

Key query components

| | |
|---|---|
| isSuspicious | Binary value (yes or no) |
| Activity | Integer value over 90 days |
| PagesTested | Integer value over 90 days |
| Malware_downloads | Integer value over 90 days |
| Last_visited | Date |
| Exploit_Count | Integer value |
| Trojan_Count | Integer Value |
| Network(s) | Character Value (ASN) |
| isIntermediary | Binary Value (yes or no) |
| HasHostedMalware | Binary Value (yes or no) |
| Domains_Infected | Integer Value |
| Included_Domains | Character (Domains) |

This information is then used by the module 530*b* to score the domain. The isSuspicious value is be used to directly score the domain, in a manner similar to that used by the collection feed score module 530*a*. The remaining values are analyzed and compared against threshold values indicative of malicious activity, and used to increase or decrease the maliciousness ranking of the domain accordingly. For example, the higher the Activity, PagesTested, Malware_downloads, Exploit_Count, Trojan_Count Domains_Infected values are, the higher the maliciousness ranking of the domain would be.

For example, the maliciousness score could be adjusted as follows:

If Domain=is Suspicious then score=+1
If suspicious Activity<=10 then score=0
If suspicious Activity>=11 &&<=20 then score=+1
If Malware_Downloads<0 then score=0
If Malware_Downloads>1 then score=+1

Pages Viewed divided by Pages Malicious=x percent (if percent <30%, +0; if percentage is <50%, +1, if percent is >60%, +2)

The other factors would also cause appropriate adjustments to the maliciousness ranking, or the confidence level score. The module 530*b* also identifies other domains enumerated in the diagnostic page as being possibly malicious, or infected, and inputs them into the database 30 for further processing by the scoring engine 500.

Another example of an external public threat categorizer module 530*b* is a module that queries externally maintained lists of known malicious addresses, such as domains, IP addresses, URLs, email addresses. If the address is returned as malicious by one or more such lists, then the address is given a higher maliciousness ranking. The more independent and separate lists that a given address appears on, the higher the confidence level that is assigned to the intelligence information record for that address, since multiple independent sources all agree that the site is malicious.

The HTTP host fingerprinting module 530*c* processes threat data associated with HTTP hosts, such as domains, URLs or IP addresses suspected of fostering malicious software or other malicious activity. This module is particularly useful for identifying a command and control domain for a botnet, or a phishing domain or website. This module receives the intelligence information record and queries the suspected host, to gather additional information from the host. For example, the module will determine the status of the host, for example whether the host is active or inactive (i.e. "up" or "down"). The module will also seek to obtain a hash of data associated with a threat posed by the host. For example, if the host is suspected of supplying malicious software, the module will download a copy of the available software file and compute a hash of that file. A hash is a way to convert (or map) sets of variable length data (such as computer files) into a smaller fixed-length data set (such as integers). Each unique file will always map to the same integer. Thus the module 530*c* can confirm the presence of malicious software on the suspect host, by comparing the hash of the downloaded software and comparing it to the hashes of a variety of known malicious software packages. Also, if a given file on the suspect host is changed, it's hash value will also change. Hashing is a convenient way to quickly store "signatures" of computer files and efficiently compare them to see if they have changed. Changes could indicate the release of a new version of a malicious software package, which could increase the maliciousness ranking assigned to the host. The module is aware of the up/down patterns and data change rates typically associated with suspicious host behavior.

The module 530*c* will also gather information about the webserver and/or operating system the target host is using. The module will also gather a taxonomy of the uniform resource identifiers (URIs) (e.g. URLs and/or uniform resource names (URNs)) associated with the target host. The module 530*c* will also gather and graph the status of the host over time, looking for status patterns indicative of malicious activity such as a botnet command and control host. For example, a host that is inactive most of the time, but is active for a short period of time at the same time of day each day, could be a botnet command and control host that is trying to avoid detection. Such a host would be assigned a higher maliciousness ranking. The module therefore will factor the up/down status of the host, changes in the up/down status of the host over time, and changes in the data stored on or available from the host over time, into the maliciousness score and confidence level generated by the module.

It is preferable that this module 530*c* remain anonymous, and not be associated in any public way with the rest of the system of an embodiment of the invention. For example, this module 530*c* could be serviced by a separate connection to an ISP, which is not registered in a manner that identifies it as being part of the system of an embodiment of the invention.

The DNS information analyzer module 530*d* analyzes the information retrieved from the DNS system at step 202 (of FIG. 2) for an intelligence information record, and uses this information to identify malicious addresses (i.e. domains, IP addresses, URLs, e-mail address or others). The DNS information analyzer module 530*d* is trained to recognize properties that exist within malicious DNS domain records much more often than they exist within a normalized reference address or domain. Table 8 below enumerates variables that will be calculated when validating a domain, according to an embodiment of the invention.

TABLE 8

Example Variables Used to Analyze Domain Information

| Feature Set | Feature Name |
|---|---|
| Time-Based Features | Short life |
| | Daily similarity |
| | Repeating Patterns |
| | Access Ratio |

TABLE 8-continued

Example Variables Used to Analyze Domain Information

| Feature Set | Feature Name |
| --- | --- |
| DNS Answer-Based Features | Number of distinct IP addresses |
| | Number of distinct countries |
| | Number of domains share the IP with |
| | Reverse DNS query results |
| TTL-Value Based Features | Average TTL |
| | Standard Deviation of TTL |
| | Number of distinct TTL Values |
| | Number of TTL change |
| | Percentage usage of specific TTL ranges |
| Domain Name Based Features | % of numerical characters |
| | % of the length of the longest meaningful substring (randomness/entropy/edit distances) |

Using various algorithms, such as Euclidian distance, Change Point Detection, Cumulative Sum, or other such algorithms for measuring differences between data points or data sets, we can measure distinct differences between DNS time-based features that are indicative of malicious behavior rather than not. Where a time-based feature is measured to indicate malicious behavior, this feature adds to the maliciousness ranking reported by the module 530d. Where a time-based feature is measured to indicate an absence of malicious behavior, this feature subtracts from the maliciousness ranking.

Looking to the example features (i.e. variables) enumerated in Table 8, the shorter the life of the DNS record, the more likely it is associated with malicious activity. The more similar the daily similarity of the DNS record the less likely it is associated with malicious activity. The more often there are repeating patterns in the information in the DNS record over time, the more likely it is associated with malicious activity. Access ratio from a distinct asset(s) calculated with other variables such as the lifespan of the DNS name created can also indicate malicious behavior. For example, a non-known DNS access that has a short create time and is being accessed twice repeatedly on the hour could be a sign of malicious behavior. This suggests a machine-based request versus a human in many situations. Access Ratio also can be considered fast. If you have a combination of requests at a rapid rate of Non-existent domains within the network happen within seconds, this would also be considered suspicious behavior.

By scoring the DNS Answer-Based Features, and comparing them against known data sets representative of malicious activity, a threshold is identified that will assist in assessing and identifying unique malicious activity associated with the DNS record. Where an answer-based feature is measured to indicate malicious behavior, this feature adds to the maliciousness ranking reported by the module 530d. Where an answer-based feature is measured to indicate an absence of malicious behavior, this feature subtracts from the maliciousness ranking.

Looking to the example features (i.e. variables) enumerated in Table 8, the lower the number of distinct IP addresses associated with the record, the less likely it is to be associated with malicious activity. The higher the number of distinct countries associated with the record, the more likely it is to be associated with malicious activity. The higher number of domains shared by the IP address, the more likely it is to be associated with malicious activity (though there are many hosting providers that have many domains shared by one IP address, which are not malicious). The reverse DNS query results can also contribute to the scoring of the intelligence information record being analyzed by the module 530d. A reverse query will reveal the Time-To-Live value (when short this could be an indicator of maliciousness when combined with other variables). This also identifies the network it resides on (or networks). Some of these networks have been rated as higher risk and can be marked with a higher score for known-malicious activity. Similarly, if the domain is on a known non-malicious network, this will lower the score.

Scoring the TTL-Value Based Features, and comparing them against known data sets representative of malicious activity, also assists in assessing and identifying unique malicious activity associated with the DNS record, particularly when combined with measurements of the deviation these values. For example, a high Average TTL is less likely to be considered malicious, as it's requirements for change and dynamic adaptability is less. This does not include content providers such as streaming services etc. A lower Average TTL combined with a new Domain name is likely to change IP addresses once one of them is taken down. This low value is considered a likely suspicious behavior depending on some of the other factors as well.

And finally, for the Domain Name Based Features, utilizing algorithms such as Levenschtein distance for measuring the amount of difference between two sequences (such as the name of the domain), and measurements of randomness, we can score with a strong sense of probability the likeliness of malicious behavior associated with the actual name selected for the domain.

Looking to the example features (i.e. variables) enumerated in Table 8, the higher the percentage of numerical characters, the more likely it is to be associated with malicious activity. The higher the percentage of the length of the longest meaningful substring, the more likely it is to be associated with malicious activity.

Figure 6:
FIG. 6 shows example domain name record data, used in an embodiment of the invention.

An example of a domain name analysis is discussed with reference to FIG. 6. The example domain record can be retrieved using a variety of commonly-known network tools, such as the "whois" tool, or a name server lookup query (such as a DNS lookup query). The domain name can be further broken down to identify the various networks associated with the domain name, as shown in FIG. 6. For example, the domain name has an IP address of 46.251.237.240, which belongs to a network block of IP addresses defined by the CIDR notation 46.251.224.0/20. The domain belongs to the Autonomous System identified by the ASN AS3.435. The domain is served by the name servers ns1.reg.ru and ns2.reg.ru, each of which have their own IP address, network block of IP addresses, and ASN numbers. The domain belongs to the top-level domain "ru", which identifies Russia.

The first feature that is analyzed is the time the domain record was created. This is the "short life" feature discussed above. In this example, at the time of the analysis, the domain is less than 24 hours old. Additionally, the domain associated with this domain name record has already been reported as malicious, by the information source 20 which provided this domain to the data collector 10. These two factors each increase the maliciousness ranking for this domain. Further examination of the DNS information associated with this example domain reveals that there are fourteen other domain names registered in the DNS database, that all share the same IP address space. This is an example of a DNS answer-based feature that indicates malicious activity. Thus the maliciousness ranking for this domain is further increased.

An additional capability of an embodiment of the invention is to capture these other identified domains as potentially malicious domains, and analyze them for inclusion in the database 30 or data warehouse 40 as malicious domains.

For example, analysis of the domain name information of FIG. 6 reveals the additional domain name record of FIG. 7, as a domain that shares the same IP address space with the domain name of FIG. 6. Additional analysis of this second domain name, as compared with the information for the first domain name, reveals that the same email address was used to register the first domain, a day prior to the registration of the second domain. This information causes the module 530*d* to report the second domain as having a higher maliciousness ranking, based on the correlation with the first domain. If the second domain, after being analyzed by the scoring system 500, is scored as a malicious domain, it is added pre-emptively (i.e. before it is reported to the data collector 10 by any external information source 20) to the database 30 or the data warehouse 40.

Analysis of the domain name information of FIGS. 6 and 7 leads to a third domain, the information for which is shown in FIG. 8. This third domain also has the same email address as the domains of FIGS. 6 and 7, it was registered the same day as the domain of FIG. 7, and the day before the domain of FIG. 6. And the prior domains analyzed, which were registered by the same subject, were considered malicious. These factors all contribute to assigning a higher maliciousness ranking to the domain of FIG. 8.

Furthermore, in an embodiment of the invention, the intelligence information records for all of these related domains (e.g. of FIGS. 6-8), which were registered by the same subject, are associated with each other in the database 30 or data warehouse 40. This creates a cluster-based taxonomy, essentially a domain-pool that is also utilized to assist in scoring domains by matching properties of newly discovered domains with the existing, known, clusters. If these clusters achieve a high ranking in malicious activity, any new domains with similar relations will get scored similarly, and will also present as malicious, or likely to be malicious. After such scoring, these new domains are then added to the appropriate cluster.

The domain generation analyzer 530*e* examines patterns of registrations of domains, over time. These patterns may be extracted from the information provided to the data collector 10 by the information sources 20. For example, this information could be included in the consumer feedback 20*d* received from the consumers of the threat intelligence information. Many popular malware types, and other sources of malicious activity, use domain generation algorithms that generate up to over 1000 domains daily, for use to provide command and control (C & C), for example for a botnet. However, a given user can only generally purchase 3-4 domains per day, due to limitations imposed by the domain name registrars. Thus, there is a lag between the domain generation algorithms used by the botnet commanders, and the actual acquisition of those domains by the users in the botnet. This leads to a high number of requests issued by the botnet commander for domains that do not yet exist. By looking for these non-existent domain requests, the domain generation analyzer can predict the domains that will be registered in the near future. Such domains can then be assigned a higher maliciousness ranking, and can also be pre-emptively added to the database 30 or the data warehouse 40.

The wide-area pattern analyzer 530*f* is useful to look for patterns in information for addresses (e.g. domains, IP addresses, URLs, etc.) across multiple assets on the network. For example, certain IP addresses associated with assets that host a wide variety of content are difficult to assign a maliciousness score to. Providers such as Yahoo!, Amazon EC2, and Google offer hosting services to a large number of users, for example by offering Virtual Private Server (VPS) functionality. A VPS is a virtual machine provided by an asset such as Google, which appears to the outside world as a stand-alone server hosting a given user's domain, website, or other data. These collections of VPS will share the IP address of the provider asset.

It is likely that some users of VPS services will host malicious activity, but it is also likely that many users of these services will not host malicious activity. Thus, it is not appropriate to put the IP address for the entire asset (e.g. Google) on either a white list (flagging it as non-malicious) nor on a blacklist (flagging it as malicious). Instead, the wide-area pattern analyzer 530*f* looks to other information that is associated with the IP address for these assets. For example, the domain name or names associated with the IP address, or the URL information associated with the IP address. The analyzer 530*f* will examine domain name or URL information from a variety of these assets, and look for patterns indicative of malicious activity. Examples of these patterns have already been discussed above in the discussion of the DNS information analyzer 530*d*. Further examples would include URLs which exhibits similar characteristics as those discussed above for domain names. These characteristics would indicate, for example, automated activity such as automatic generation of new URLs or domain names, which is typically associated with malicious activity.

The manual scoring module 530*g* is a module that is used by human analysts, to manually assign a maliciousness ranking and a confidence level to an address. This module is particularly useful to target addresses that have not yet been picked up by the various information sources 20 as being possibly malicious. For example, when a new threat such as a virus first emerges, the source of the threat needs to be communicated to the downstream consumers, but the threat has not yet been reported by the information sources 20. The manual scoring module 530 permits either real-time online assignment of maliciousness rankings and confidence levels, or alternatively permits batch uploading of bulk assignments, as needed to respond to newly identified threats. This data is then passed on to the database 30 and data warehouse 40, through the scoring engine 500. The data about new threats then forms part of the information passed on to the consumers of the threat intelligence information.

Once the threat intelligence information received from the information sources 20 is fully processed and scored, then at step 208 of FIG. 2, the threat intelligence information is prepared for distribution to the consumers. Prior to distribution to customers, the outgoing threat intelligence information is optionally reviewed by a human threat analyst, to quality check the data. Any errors noted by the analyst are corrected. These errors may also be reported back to the various scoring modules 530, to enhance these modules' ability to correctly score future threat intelligence information.

Each consumer has a preferred format it wishes to receive the threat intelligence information in. For example, some consumers may use a commercial SIEM tool, such as Arcsight (available from Hewlett-Packard Company, of Palo Alto, Calif.), RSA enVision, available from EMC Corporation of Hopkinton, Mass.), Q1 Radar (available from Q1 Labs, an IBM Company, of Waltham, Mass.), and will expect the threat intelligence information to be presented in a format compatible with that tool. Other consumers may have their own proprietary analysis tools, and will expect to receive the data in a proprietary format.

With reference again to FIG. 1, the system of an embodiment includes a distributor 50, which receives the outgoing threat intelligence information from the data warehouse 40, or the database 30, and formats it for delivery to the consumers 60. The distributor 50 provides the threat intelligence information using a variety of information pathways 55. For example, the distributor 50 provides the threat intelligence information using system log messaging paradigms such as the syslog transport protocol, which delivers messages periodically (e.g. every 6 hours). Each delivery includes the entire set of threat intelligence information available in the data warehouse 40 or database 30. Alternatively, only the changes since the last delivery may be sent.

An example of such a syslog message would be:

Jan 18 11:07:53 hostname message

The hostname is the identifier for the sender of the message.

The message portion will contain, for a consumer using Arcsight:

CEF:0|Vigilant|Intelligence Feed|1.0|Feed ID|Feed Name|Severity|Extension

Where the Feed ID and Feed Name identify one of a plurality of information feeds provided to the consumer 60. In a preferred embodiment, the distributor 50 will generate four separate feeds of threat intelligence information:

Malicious Domain Feed—List of malicious domains/sub-domains minus domains/sub-domains on whitelist.

Malicious IP Feed—List of malicious IP addresses minus IP addresses on whitelist.

Malicious URL Feed—List of malicious URLs.

Phishing Email Feed—List of phishing email addresses.

The Severity is a coarse-grained evaluation of the importance of the threat being reported. The Extension field contains further details about the threat, expressed as a list of key-value pairs. The keys sent in an embodiment of the system of an invention are shown in Table 9 below.

TABLE 9

Keys for syslog messages to consumers

| Key | Description |
| --- | --- |
| cs1 | Custom String 1. Used for value of "address". |
| cs1Label | Label for custom string 1. i.e. "Domain Name" or "Email Address" |
| cs2 | Custom String 2. Used for value of "Detect DateTime" |
| cs2Label | Label for custom String 2. i.e. "Detect DateTime" |
| cs3 | Threat Type or Threat category |
| cs3Label | Label for Custom String 3. i.e. "Threat Type" |
| cn1 | Custom number 1. Used for "CTI Maliciousness". Integer (−100 to 100). Positive number is an indicator of maliciousness and negative number is an indicator of goodness. Higher the more malicious. More negative approaches whitelisting. Formula: CTI Maliciousness (m) -> severity, severity = round (100 * m, 0) |
| cn1Label | Label for custom number 1. Value equals "CTI Maliciousness" |
| cn2 | Custom number 2. Used for "CTI Confidence". Integer (0 to 100). Higher value represents high confidence. |
| cn2Label | Label for custom number 2. Value equals "CTI Confidence" |
| act | Action or instructions on handling the message. Valid value defined currently is "add_unique"; Add to active list uniquely based on cs1 or request or dst, cs3 |
| msg | Name of feed |
| request | Value of the malicious URL |
| dst | Value of the malicious IP |
| severity | Severity value range from 0-10. Higher number equals higher severity. CTI Maliciousness (m) -> severity, severity = round (10 * m, 0) |

Alternatively, the distributor 50 can deliver the threat intelligence information using other pathways, such as a secure file transfer protocol (SFTP) pathway. Some SIEM tools, such as enVision, maintain watch lists of malicious domains, which are updated by a script resident on the consumer's network, from a file provided to the consumer 60 by the distributor 50 over an SFTP link. Alternatively, the distributor 50 can deposit the threat intelligence information into a drop-box, which is made available to the consumers 60 so they can download the threat intelligence information manually at their convenience. These deliveries may also be scheduled periodically, as noted above for the syslog pathway. The threat intelligence information received by the consumers 60 is then imported into the consumers SIEM tools, or otherwise presented to the network administrators 70 for further use to identify and defeat threats to the information networks. The consumers 60 also have feedback modules 65 which supply feedback data 20d back to the information collector 10, as discussed above.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, unless otherwise stated, and the invention can be performed using different or additional process actions or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A system for collecting threat intelligence information, comprising:
    a database for storing threat intelligence information;
    a threat information collector configured to collect threat intelligence information from a plurality of threat intelligence information sources, the collected threat intelligence information including different formats;
    a threat intelligence information parser configured to (i) parse the collected threat intelligence information into a common format and (ii) store the parsed threat intelligence information in the database;
    a threat intelligence information scoring engine configured to (i) receive the parsed threat intelligence information from the database and (ii) calculate at least one threat score based on the parsed threat intelligence information; and
    a threat intelligence information distributor configured to (i) format the parsed threat intelligence information and the at least one threat score into a plurality of delivery formats and (ii) distribute the formatted threat intelligence information to a plurality of threat intelligence information consumers based on predefined consumer preferences.

2. The system of claim 1, wherein the plurality of threat information sources comprises at least one publicly available source of threat intelligence information.

3. The system of claim 1, wherein the plurality of threat information sources comprises at least one feedback source from at least one of the plurality of consumers.

4. The system of claim 1, wherein the plurality of threat intelligence information sources comprises at least one anonymous intelligence collector configured to anonymously gather threat intelligence information from a malicious activity location.

5. The system of claim 1, further comprising a threat intelligence information categorizer configured to categorize the collected threat intelligence information using a plurality of threat categories.

6. The system of claim 1, wherein the threat intelligence information scoring engine comprises a plurality of scoring modules each configured to (i) apply a different scoring methodology to the parsed threat intelligence information and (ii) derive at least one respective threat module score.

7. The system of claim 6, wherein the threat intelligence information scoring engine is configured to aggregates the respective threat module scores to calculate the at least one threat score.

8. The system of claim 7, wherein the threat intelligence information scoring engine is configured to apply a weighted mathematical average to the respective threat module scores based on a plurality of weights assigned to the plurality of scoring modules.

9. The system of claim 6, wherein one of the plurality of scoring modules comprises a collection feed scoring module configured to derive at least one respective threat module score based on information supplied by at least one of the plurality of threat intelligence information sources.

10. The system of claim 6, wherein one of the plurality of scoring modules comprises an external threat categorizer configured to derive at least one respective threat module score for at least one threat identified in the collected threat intelligence information based on information about at least one source of the at least one threat, the information about the at least one source being supplied by at least one of the plurality of threat intelligence information sources.

11. The system of claim 6, wherein one of the plurality of scoring modules comprises a host fingerprinter configured to derive at least one respective threat module score based on information collected about a host identified in the collected threat intelligence information.

12. The system of claim 11, wherein the information collected about the host comprises information collected by an anonymous intelligence collector configured to anonymously gather threat intelligence information from a malicious activity location.

13. The system of claim 6, wherein one of the plurality of scoring modules comprises a Domain Name Service ("DNS") information analyzer configured to derive at least one respective threat module score based on information obtained from a DNS server about a source identified in the collected threat intelligence information.

14. The system of claim 6, wherein one of the plurality of scoring modules comprises a domain generation analyzer configured to derive at least one respective threat module score based on information about domain generation activity related to a source identified in the collected threat intelligence information.

15. The system of claim 6, wherein each of the at least one respective threat module score comprises a maliciousness ranking and a confidence level.

16. The system of claim 1, wherein the threat intelligence scoring engine is configured to identify additional threat intelligence information about a previously unknown source of possible malicious activity, and stores the additional threat intelligence information into the database for analysis.

17. A method for collecting threat intelligence information, comprising:
collecting threat intelligence information from a plurality of threat intelligence information sources, the collected threat intelligence information including different formats; and
using at least one data processing device:
parsing the collected threat intelligence information into a common format;
calculating at least one threat score based on the parsed threat intelligence information;
formatting the parsed threat intelligence information and the at least one threat score into a. plurality of delivery formats; and
distributing the formatted threat intelligence information to a plurality of threat intelligence information consumers based on predefined consumer preferences.

18. A method for analyzing threat intelligence information, comprising:
receiving threat intelligence information from at least one threat intelligence information source; and
using at least one data processing device:
processing the threat intelligence information into at least one threat intelligence record, each record of the at least one record comprising data regarding a respective threat;
causing each module of a plurality of threat scoring modules to calculate a module score for each record of the at least one record, each module of the plurality of modules being configured to apply a different scoring methodology, and each calculated module score being indicative of a maliciousness level of the respective threat;
deriving, using a scoring engine, a threat score for each record of the at least one record by applying a weighted mathematical average to the module scores calculated for that record, the average being based on a plurality of weights assigned to the plurality of modules; and
providing the at least one threat intelligence record and the corresponding threat scores to at least one threat intelligence information consumer.

19. The method of claim 18, wherein each of the module scores comprises a confidence level.

20. The method of claim 18, wherein each of the respective threats comprises one of a uniform resource locator ("URL"), an e-mail address, an internet protocol ("IP") address, and autonomous system information.

21. A system for analyzing threat intelligence information, comprising:
a database for storing threat intelligence information; and
at least one data processing device configured to:
process the threat intelligence information into at least one threat intelligence record, each record of the at least one record comprising data regarding a respective threat;
cause each module of a plurality of threat scoring modules to calculate a module score for each record of the at least one record, each module of the plurality of modules being configured to apply a different scoring methodology, and each calculated module score being indicative of a maliciousness level of the respective threat:
derive, using a scoring engine, a threat score for each record of the at least one record by applying a weighted mathematical average to the module scores calculated for that record, the average being based on a plurality of weights assigned to the plurality of modules; and
provide the at least one threat intelligence record and the corresponding threat scores to at least one threat intelligence information consumer.

* * * * *